United States Patent [19]
Vorfloussev

[11] Patent Number: 5,973,762
[45] Date of Patent: Oct. 26, 1999

[54] FERROELECTRIC LIQUID CRYSTAL CELL WITH A MONOCHEVRON STRUCTURE OF SMECTIC LAYERS

[75] Inventor: Valeri Vorfloussev, Kent, Ohio

[73] Assignee: Kent State University, Kent, Ohio

[21] Appl. No.: 09/090,739

[22] Filed: Jun. 4, 1998

[51] Int. Cl.[6] .............................................. G02F 1/1337
[52] U.S. Cl. ...................................................... 349/133
[58] Field of Search ..................................... 349/133, 123

[56] References Cited

U.S. PATENT DOCUMENTS

| | | | |
|---|---|---|---|
| 3,725,899 | 4/1973 | Greubel | 340/324 |
| 4,995,705 | 2/1991 | Yoshinaga et al. | 349/123 |
| 5,189,536 | 2/1993 | Hanyu et al. | 359/56 |
| 5,267,224 | 11/1993 | Yamazaki | 369/13 |
| 5,268,777 | 12/1993 | Sato | 359/57 |
| 5,282,069 | 1/1994 | Sato | 359/58 |
| 5,339,306 | 8/1994 | Yoshinaga et al. | 369/275 |
| 5,473,450 | 12/1995 | Yamada et al. | 359/51 |

Primary Examiner—William L. Sikes
Assistant Examiner—James Dudek
Attorney, Agent, or Firm—Renner, Kenner, Grieve, Bobak, Taylor & Weber

[57] ABSTRACT

A ferroelectric liquid crystal cell with a monochevron structure includes a pair of opposed substrates each having an alignment layer. The alignment layer includes a conventional polymer and a ferroelectric copolymer. A ferroelectric liquid crystal material is disposed between the pair of opposed substrates and interacts with the alignment layers which force the ferroelectric liquid crystal into a monochevron structure because of the interaction between the ferroelectric liquid crystal material polarization and polarization of the alignment layers.

9 Claims, 1 Drawing Sheet

U.S. Patent Oct. 26, 1999 5,973,762
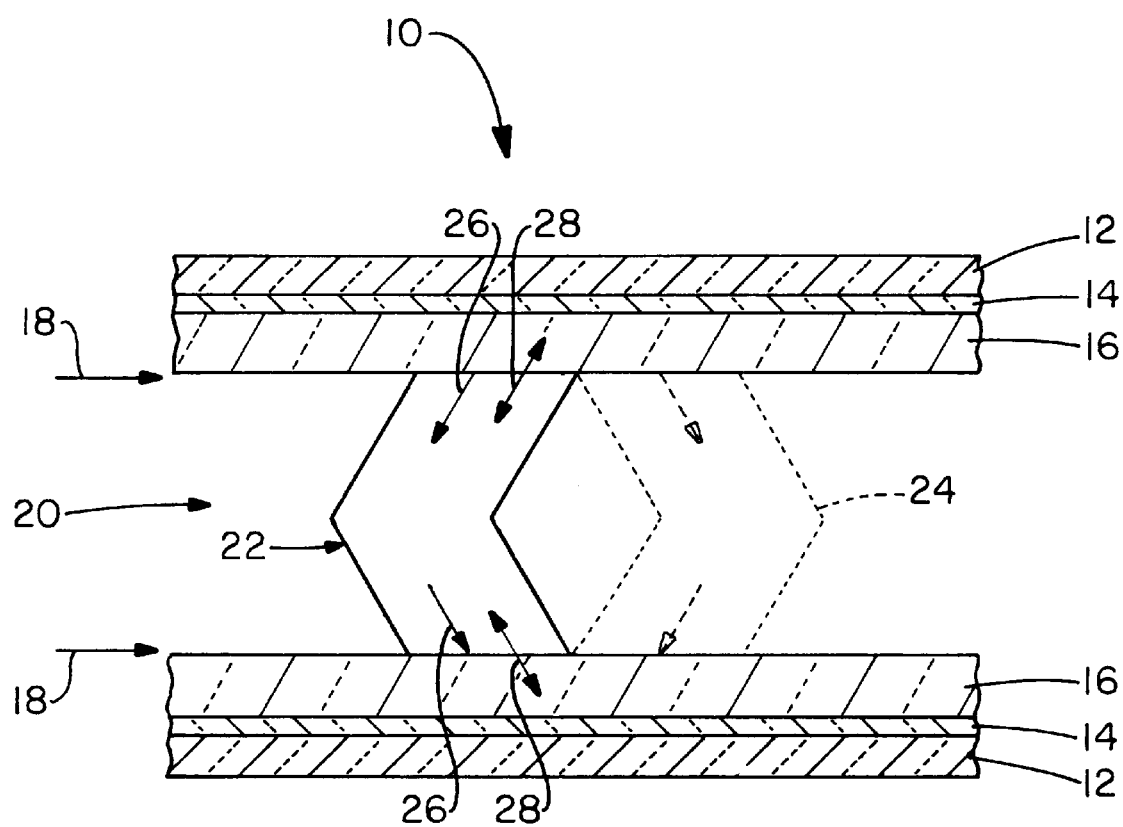

FERROELECTRIC LIQUID CRYSTAL CELL WITH A MONOCHEVRON STRUCTURE OF SMECTIC LAYERS

TECHNICAL FIELD

The present invention herein resides in the art of light modulating devices. Specifically, the present invention relates to polymers and liquid crystal materials used in such devices. More specifically, the present invention relates to light modulating elements in which the alignment layer comprises a ferroelectric polymer which may be used with an amorphous polymer and wherein the alignment layer induces the formation of a defect-free ferroelectric liquid crystal structure in the light modulating device.

BACKGROUND ART

The rapid advance of information technology has created the need for high performance information displays having high spatial resolution, wide viewing angles, rapid response, low weight, low volume, low cost and low power usage. Conventional cathode-ray tube (CRT) displays satisfy the performance requirements but do not generally meet desired weight, volume, and power usage targets. Flat panel displays using liquid crystal (LC) technology represent an alternative to conventional CRT displays. However, due to the limitations of current LC technology, existing flat panel displays do not provide at this time the performance level characteristic of CRT displays.

Current flat panel display technology mainly utilizes nematic liquid crystal materials driven through an active or passive matrix. These displays offer restricted viewing angles, smearing of fast-moving images, restricted overall dimensions, and always consume external electric power to maintain the image. As an alternative, displays using ferroelectric liquid crystal materials overcome many of the limitations of the nematic liquid crystal displays. Surface stabilized ferroelectric liquid crystal displays offer hemispherical viewing angles and a rapid, bistable response. These characteristics potentially make ferroelectric liquid crystal displays superior to nematic liquid crystal displays.

The advantages of ferroelectric liquid crystal displays derive in part from the properties of the ferroelectric liquid crystal material. In its smectic C* state, a ferroelectric liquid crystal material exists in a layered molecular orientation with a molecular director vector n tilted from the layer normal by temperature-dependent angle $\theta$. Dipolar contributions of individual molecules within a layer result in a spontaneous polarization vector $P_s$ linearly coupled with the tilt angle $\theta$. From layer to layer, the molecular director continuously rotates at a constant tilt angle $\theta$ around the layer normal due to the chirality of the smectic C* phase. One complete rotation of the director occurs through a distance known as the pitch.

If the ferroelectric liquid crystal material is contained within a cell of thickness comparable or less than the pitch of the material, the material assumes a molecular orientation wherein the molecules are parallel to the cell walls but exist in two distinct domains. In each of these two domains, the molecular director has a distinct orientation. The material contained in this way is referred to in the art as a surface-stabilized ferroelectric liquid crystal. The relative surface area covered by the domains vary in response to an externally applied electric field due to the linear interactions between the field and the spontaneous polarization of the material. When viewed through crossed polarizers the domains reveal electrooptical switching in response to changes in the electrical field. Advantageous features of this switching are bistability due to the two possible orientations of the molecular director, fast switching time due to strong linear coupling between the electric field and the spontaneous polarization, and a hemispherical viewing angle because in both possible director orientations the molecules form uniaxial birefringent plates that can be easily compensated.

A drawback of ferroelectric liquid crystal displays is their tendency to exhibit so-called "zig-zag" defects. In fabricating the displays, the zig-zag defects generally appear during cooling of the liquid crystal materials to reach the ferroelectric smectic C* phase or as a result of mechanical deformation of the liquid crystal display. An understanding of the source and nature of these defects is gained by considering the makeup of a typical liquid crystal light modulating cell. As is well-known in the art, a typical cell consists of two opposed glass or plastic substrates each having an electrode on its inner surface. A polymer alignment layer is disposed on each of the electrodes. When rubbed in a certain manner the polymer layer induces alignment of the molecular director in the liquid crystal material contained within the cell. Along with the alignment inducement, the polymer layer also induces an angular displacement of the liquid crystal molecules with respect to the polymer layer. The induced angle, or pre-tilt, is characteristic of a given polymer and is typically 2–3 degrees for conventional alignment polymers. When both alignment layers are rubbed in the same direction, the interaction of the polymer alignment layer with the ferroelectric liquid crystal in its smectic C* phase typically results in a chevron-like smectic layers orientation. Usually, two chevron patterns, each oriented in an opposite direction, are generated between the substrates. The boundary between macroscopic areas having different chevron patterns appears as a zig-zag defect using polarized transmitted light microscopy. If the layers are rubbed in opposite directions the resulting molecular orientation shows an increased number of zig-zag defects. These zig-zag defects are undesirable as they reduce the image contrast in ferroelectric liquid crystal cells, thus limiting the use of ferroelectric cells in various applications. It is therefore desirable to provide a ferroelectric liquid crystal cell wherein the liquid crystal in the smectic C* phase exists only in one chevron orientation.

Various approaches exist to overcome the zig-zag defects include treatment in a high frequency electric field, shearing of the cell substrates and gradient cooling. These approaches are not, however, compatible with existing liquid crystal display fabrication technology. Hanyu, U.S. Pat. No. 5,189,536, teaches a method to prevent zig-zag defects that is compatible with existing fabrication technology. This method relies on increased pre-tilt angles up to 10–15 degrees between the ferroelectric liquid crystal material and the alignment layer. Unfortunately, this method results in displays having increased switching times required for bistable response.

Therefore, a need exists for a method to prevent the appearance of zig-zag defects in ferroelectric liquid crystal displays. Moreover, there is a need for such a method that is compatible with existing display fabrication technology without compromising the performance of the displays.

DISCLOSURE OF INVENTION

In light of the foregoing, it is a first aspect of the present invention to provide a surface stabilized ferroelectric liquid crystal cell with a monochevron structure and thus no zig-zag defects in the cell.

It is another aspect of the present invention, as set forth above, to provide an alignment polymer on opposed substrates that forces the formation of the monochevron structure.

It is yet another aspect of the present invention, as set forth above, to provide an alignment layer that is made from a ferroelectric polymer or copolymer which may be used with a conventional amorphous alignment polymer, wherein the alignment layer induces a monochevron structure surface-stabilized ferroelectric liquid crystal cell.

It is still another aspect of the present invention, as set forth above, to induce polar properties in the alignment layer to facilitate formation of the monochevron structure.

An additional aspect of the present invention, as set forth above, is to provide an electrode between each substrate and its alignment layer to allow application of an electric field to force the ferroelectric liquid crystal material into different states or textures.

The foregoing and other aspects of the present invention which shall become apparent as the detailed description proceeds are achieved by a ferroelectric liquid crystal cell having a monochevron structure, comprising a pair of opposed substrates, an alignment layer disposed on each substrate facing the opposite substrate wherein the alignment layer comprises a ferroelectric copolymer, and a ferroelectric liquid crystal material disposed between the pair of opposed substrates, the alignment layers forcing the ferroelectric liquid crystal into a monochevron structure.

Other aspects of the present invention are obtained by a method of forming a monochevron structure of smectic layers in a ferroelectric liquid crystal cell, comprising the steps of preparing an alignment layer mixture which comprises an amorphous polymer and a ferroelectric copolymer, disposing the alignment layer mixture on a pair of substrates and allowing the mixture to cure to form an alignment layer on each substrate, inducing azimuthal properties in at least one of the alignment layers, disposing a ferroelectric liquid crystal material in its isotropic phase between the opposed substrates wherein the alignment layers face one another, cooling the ferroelectric liquid crystal material to its smectic C* phase, wherein interaction between the ferroelectric liquid crystal material and the alignment layer forms a chevron-like structure of the ferroelectric liquid crystal material between the substrates.

At least one or more of the foregoing objects, together with their advantages over the prior art relating to ferroelectric liquid crystal cells, which shall become apparent from the specification that follows, are accomplished by the invention as hereinafter described and claimed.

BRIEF DESCRIPTION OF THE DRAWING

For a complete understanding of the objects, techniques, and structure of the invention, reference should be made to the following detailed description and drawing which is a schematic representation of a surface-stabilized ferroelectric liquid crystal cell with a monochevron structure.

BEST MODE FOR CARRYING OUT THE INVENTION

Referring now to the drawing, it can be seen that a ferroelectric liquid crystal cell having a monochevron structure is designated generally by the numeral 10. The cell 10 includes opposed substrates 12 which may be either a glass or plastic material that is optically clear in appearance. Each substrate 12 is provided with an optically clear electrode 14, wherein both electrodes are connected to a voltage source (not shown) for switching the cell between distinct molecular orientations.

An alignment layer 16, which will be discussed in further detail hereinbelow, is disposed on each of the electrodes 14 in a manner well known in the art. Each alignment layer 16 is rubbed in the same direction 18 for reasons which will also become apparent. A ferroelectric liquid crystal material 20 is disposed between each substrate 12 and sealed in a manner well known in the art.

As discussed in the background of the invention, it is very desirable for the FLC material to exhibit a monochevron structure 22. In cells where a second chevron structure 24 is formed, indicated by the dashed lines in the drawing, the transition between the two chevron structures create zig-zags and thereby reduce the desirable properties of the cell 10. In order to obtain the monochevron structure 22 throughout the cell 10, the alignment layer 16 is made up of a mixture of ferroelectric polymers or copolymers which may be combined with polymers well-known in the art as alignment polymers.

One example of a ferroelectric copolymer that exhibits the desired forming of a monochevron structure is the copolymer of poly(vinylidene fluoride) and tetrafluoroethylene. The amount of the copolymer of poly(vinylidene fluoride) and tetrafluoroethylene used in alignment layer 16 ranges from about 30% to about 70%, with the remainder of the alignment layer mixture 16 made up of a, conventional alignment polymer such as

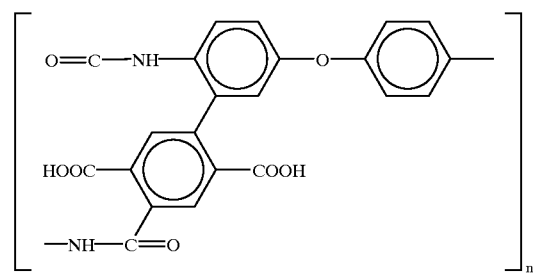

Preliminary testing has determined that a preferred concentration of the ferroelectric copolymer is about 50% of the entire mixture. Other ferroelectric polymers and copolymers are believed to be useful as all or part of the novel alignment layer 16. Other ferroelectric polymers or copolymers that are envisioned for use and within the scope of the present invention are poly(vinylidene fluoride), copolymers of vinylidene fluoride and trifluoroethylene, ethylene-tetrafluoroethylene alternating copolymer and ferroelectric nylons.

After the mixture is constituted with a solvent, it is disposed on the substrates 12 by spin coating the mixture in 99.5 weight percent of DMF (dimethylforamide), at 4000 RPM at room temperature. The spin-coated film is then dried at T=200° C. for 1 hour to evaporate the solvent and polymerize the components. Of course, the electrodes 14 are provided on each substrate 12 prior to disposition of the alignment layer 16.

If desired, an insulating layer may be placed between the alignment layer 16 and the electrode 14 to prevent shorting between the electrodes 14 at small cell thicknesses.

Once the alignment layers 16 are disposed on the substrates 12, azimuthal anisotropy of the alignment layer is induced. In the preferred embodiment, the anisotropy is induced by rubbing each alignment layer 16 in the direction 18 in a manner well known in the art. Of course, other methods for inducing azimuthal properties, such as by stretching a soft plastic substrate with the alignment layer thereon, by eliminating photo-sensitive polymers with linearly polarized light or by oblique evaporation may be employed. The azimuthal anisotropy is believed to be a special arrangement of the ferroelectric copolymer molecules or crystallites which in turn provide anisotropic polar properties on application of an external electric field applied to the alignment layer. The azimuthal property is believed to depend on the inducing process.

Once the alignment layers 16 are properly prepared, the FLC material 20 having spontaneous polarization ($P_s$) properties is filled between the substrates 12 in its isotropic phase, non-liquid crystalline state. Upon gradual cooling of the cell 10, the FLC material 20 experiences phase transitions from the isotropic to the non-polar nematic and non-polar smectic A phases. As is usual for ferroelectric liquid crystal cells known in the art, the alignment layer 16 orients the liquid crystal material while in its nematic and smectic A phases. At certain temperatures, dependent upon the particular liquid crystal material used, the FLC material 20 undergoes a transition from the smectic A to smectic C* phase. Near this transition, the smectic layers form the monochevron structure 22 even at small pre-tilt angles of 2–3 degrees. Formation of the smectic C* phase results in a spontaneous polarization ($P_s$) 26 of the FLC material. At this point in the cooling process, it is believed that the electric field in the alignment layer 16 resulting from the spontaneous polarization of the FLC material 20 induces an orientation of the crystallite's polar properties in the alignment layers 16 so as to form anisotropic polarization or dipoles 28 which are substantially parallel to the direction of the spontaneous polarization 26.

As discussed in the background of the invention, further cooling after the transition from the smectic A to the smectic C* phases caused the FLC material to exhibit formation of a second chevron structure 24 coexisting with the initially-formed monochevron structure 22. The coexisting chevron orientations result in contrast lowering zig-zag defects. However, by employing the alignment layers 16 of the present invention, further cooling of the FLC material causes an interaction or coaction between the FLC material 20 and its spontaneous polarization 26 with the alignment layer 16 and its anisotropic polarization 28 to constrain the molecules within the FLC material 20 such that the second chevron structure 24 cannot form and thus, only a monochevron structure 22 results. Accordingly, no zig-zag defects are apparent and the cell 10 does not suffer the poor contrast characteristics of cells known in the art.

It is further theorized that the alignment layer 16 produces a pretilt of the FLC material molecules. This formation of the monochevron structure 22 causes the spontaneous polarization 26 to be oblique to the substrates 12 normal, thereby inducing polarization 28 in the alignment layer 16 in the same direction. As such, and as evident from known FLC cells, the anisotropic polarization 28 in an amorphous alignment layer does not have a preferred direction and its value is small when chevron structures 22 and 24 are formed, thereby creating the textural defects. However, by employing the present invention, the polarization 28 is anisotropic and it preserves its initial direction while the alignment layers still gives rise to a small pre-tilt angle. Accordingly, formation of the second chevron structure 24 would require a high cost in interaction energy and as such, formation of the second chevron structure is suppressed.

Based upon the foregoing discussion of the structure of the cell 10 and its method for fabrication, several advantages are readily apparent. Primarily, application of an electric field to ferroelectric liquid crystal material disposed between the substrates with alignment layer 16 allows for switching of the liquid crystal molecules under an external force in the substrates plane to allow hemispherical viewing of the cell. Moreover, by providing a single monochevron structure of the ferroelectric liquid crystal material, faster switching times between the bistable states are realized. Yet another advantage of the present invention is that it is easily reproducible with present manufacturing techniques and is suitable for fast manufacturing of ferroelectric liquid crystal cells. It will be appreciated that the cells utilizing the aspects of the present invention may be used with high information displays or simple electro-optical modulators. As such, it is believed that the present invention may be employed in the manufacture of high performance information displays which have high spatial resolution, wide viewing angle, fast frame change, light weight, low volume, low cost, and which are power-efficient. It is another advantage of the present invention that interaction of the ferroelectric liquid crystal material with the alignment layer is expected to decrease the cell's sensitivity to external mechanical deformations. Still another advantage of the present invention is that a monochevron structure can be provided with a minimal pre-tilt angle imparted to the ferroelectric liquid crystal material. This allows the cell to be operated with fast switching characteristics.

Thus, it can be seen that the objects of the invention have been obtained by the structure and the methods presented above. While in accordance with the Patent Statutes, only the best mode and preferred embodiment of the invention have been presented and described in detail, the invention is not limited thereto or thereby. Accordingly, for an appreciation of the true scope and breadth of the invention, reference should be made to the following claims.

What is claimed is:

1. A ferroelectric liquid crystal cell having a monochevron structure, comprising
   a pair of opposed substrates;
   an alignment layer disposed on each said substrate facing said opposite substrate wherein said alignment layer comprises a ferroelectric copolymer; and
   a ferroelectric liquid crystal material disposed between said pair of opposed substrates, said alignment layers forcing said ferroelectric liquid crystal into a monochevron structure.

2. The cell according to claim 1, wherein said ferroelectric copolymer is a copolymer of poly(vinylidene fluoride) and poly tetrafluoroethylene.

3. A ferroelectric liquid crystal cell having a monochevron structure, comprising
   a pair of opposed substrates;
   an alignment layer disposed on each said substrate facing said opposite substrate wherein said alignment layer comprises a ferroelectric copolymer, wherein said ferroelectric copolymer is a copolymer of poly(vinylidene fluoride) and poly tetrafluoroethylene and wherein said alignment layer includes a conventional polymer and wherein said ferroelectric copolymer is about 50% of said alignment layer; and
   a ferroelectric liquid crystal material disposed between said pair of opposed substrates, said alignment layers forcing said ferroelectric liquid crystal into a monochevron structure.

4. A ferroelectric liquid crystal cell having a monochevron structure, comprising a pair of opposed substrates;

an alignment layer disposed on each said substrate facing said opposite substrate wherein said alignment layer comprises a ferroelectric copolymer and wherein said alignment layers are rubbed in a same direction; and a ferroelectric liquid crystal material disposed between said pair of opposed substrates, said alignment layers forcing said ferroelectric liquid crystal into a monochevron structure.

5. The cell according to claim 4, wherein said rubbed alignment layer forms crystallites and orients the ferroelectric liquid crystal material into the monochevron structure.

6. A ferroelectric liquid crystal cell having a monochevron structure, comprising a pair of opposed substrates;

an alignment layer disposed on each said substrate facing said opposite substrate wherein said alignment layer comprises a ferroelectric copolymer; and a ferroelectric liquid crystal material disposed between said pair of opposed substrates, said alignment layers forcing said ferroelectric liquid crystal into a monochevron structure, wherein polarization of said ferroelectric copolymer interacts with polarization of said ferroelectric liquid crystal to force formation of the monochevron structure of said ferroelectric liquid crystal material.

7. The cell according to claim 6, further comprising:

an electrode disposed on each said substrate adjacent said alignment layer.

8. A ferroelectric liquid crystal cell having a monochevron structure, comprising a pair of opposed substrates;

an alignment layer disposed on each said substrate facing said opposite substrate wherein said alignment layer comprises a ferroelectric copolymer, wherein said alignment layer includes a conventional polymer and wherein said ferroelectric copolymer is between about 30% to about 70% of said alignment layer; and a ferroelectric liquid crystal material disposed between said pair of opposed substrates, said alignment layers forcing said ferroelectric liquid crystal into a monochevron structure.

9. The cell according to claim 8, wherein said ferroelectric copolymer is a copolymer of poly(vinylidene fluoride) and poly tetrafluoroethylene.

* * * * *